United States Patent [19]

Koga et al.

[11] Patent Number: 4,562,288
[45] Date of Patent: Dec. 31, 1985

[54] METHOD OF OPERATING MIXER-SETTLER

[75] Inventors: Kunio Koga; Yukihiro Sasaki; Mutsumi Samejima, all of Himeji, Japan

[73] Assignee: Daicel Chemical Industries, Ltd., Sakai, Japan

[21] Appl. No.: 574,092

[22] PCT Filed: Jul. 12, 1983

[86] PCT No.: PCT/JP83/00224

§ 371 Date: Jan. 10, 1984

§ 102(e) Date: Jan. 10, 1984

[87] PCT Pub. No.: WO84/00310

PCT Pub. Date: Feb. 2, 1984

[30] Foreign Application Priority Data

Jul. 13, 1982 [JP] Japan ............... 57-121426

[51] Int. Cl.$^4$ ........................... C07B 51/42
[52] U.S. Cl. .................. 562/608; 260/705; 422/234; 422/259; 562/513; 562/600
[58] Field of Search .......... 422/258, 259, 234; 423/658.5, 281; 562/513, 608, 600; 260/705

[56] References Cited

U.S. PATENT DOCUMENTS

| | | | |
|---|---|---|---|
| 1,839,894 | 1/1932 | Ricard et al. | 562/608 |
| 1,860,553 | 5/1932 | Ricard et al. | 260/705 |
| 2,357,344 | 9/1944 | Morris et al. | 260/705 |
| 3,903,235 | 9/1975 | Cardwell et al. | 423/38 |
| 4,018,869 | 4/1977 | Beltz et al. | 423/321 R |
| 4,039,404 | 8/1977 | Richards et al. | 423/658.5 |
| 4,424,391 | 1/1984 | Walraevens et al. | 599/525 |
| 4,432,951 | 2/1984 | De Schepper et al. | 423/89 |

OTHER PUBLICATIONS

CA 90:154097g, "Study of the Dimensional Distribution of Drops in 'Water in Oil' Emulsions in a Box-Type Mixing Settling Extractor", Nezhdanov, A. A., 1977.

CA 92:13162m, "Solvent Properties of Organic Bases for Extraction of Acid from Water", Ricker, N. L., 1979.

CA:37248v, "Solvent Extraction with Amines for Recovery of Acetic Acid from Dilute Aqueous Industrial Streams", Ricker, N. L., 1980.

Primary Examiner—Barry S. Richman
Assistant Examiner—Titus B. Ledbetter, Jr.
Attorney, Agent, or Firm—Flynn, Thiel, Boutell & Tanis

[57] ABSTRACT

In extracting object material from its aqueous solution by using an organic solvent, a mixer-settler extractor is employed as the extractor and operated while a solvent dispersion is maintained in the mixer, and part of the aqueous phase discharged from the settler is recycled to the mixer so that the organic solvent phase in the mixer is stably maintained as the disperse phase.

6 Claims, 3 Drawing Figures ated the separability of liquids in the settler of a mixer-settler extractor for the recovery of a solute from its aqueous solution using an organic extractant which consists of a tertiary amine and an organic diluent. As a result, it has been found that the most effective factor for the improvement of the separation rate is to maintain the disperse phase in the mixer in the form of a solvent phase, that is, to operate the mixer with a solvent dispersion inside.

METHOD OF OPERATING MIXER-SETTLER

TECHNICAL FIELD

This invention relates to a method of operating a mixer-settler.

More particularly, the invention concerns a method of efficiently operating a mixer-settler extractor in the extraction of a solute from its aqueous solution with the aid of an organic extractant which contains a tertiary amine.

BACKGROUND ART

Mixer-settler extractors have problems including generally higher construction cost and larger holdup in the system than tower extractors. For extractions in a limited number of stages, however, they call for less investments for equipment than the tower type. Especially with systems which involve low extraction rates or wide oil-water viscosity difference, or in cases where ingress of impurities can take place, they exhibit quite excellent characteristic performance.

In the extraction of a solute from its aqueous solution by the use of an organic extractant, such as a mixture of a tertiary amine and an organic diluent, the solvent viscosity is so high and the rate of solute travel is so low that it is not customary to employ a tower extractor, typically a perforated-plate or packed tower, which is devoid of any mechanically working part. For such an application the tower extractor must be tall enough to accommodate the very high actual height of each theoretical plate. Moreover, in order to prevent troubles such as flooding, the operation range is limited and a large-diameter extraction tower must be used, thereby causing economic disadvantage.

Thus, if efficient extraction is to be done using an organic solvent, especially an extractant system containing a tertiary amine, it is advisable to employ an extractor of, e.g. a mixer-settler type, which is designed to accelerate the frequencies of dispersion and coalescence of liquid droplets.

For the extracting operation of a mixer-settler extractor, attainment of the highest possible rate of mixed liquids separation in the settler is of prime importance. The higher the separation rate the smaller the settler size may be. The smaller settler will accordingly require a narrower installation area and may hold less liquid than ordinary settlers. These are substantial economic advantages where the organic solvent for use as an extractant and/or the construction material for the settler is expensive.

DISCLOSURE OF INVENTION

In view of the above, diversified technical investigations have been made so as to attain increased separation rates of liquids in settlers. We have extensively studied the separability of liquids in the settler of a mixer-settler extractor for the recovery of a solute from its aqueous solution using an organic extractant which consists of a tertiary amine and an organic diluent. As a result, it has been found that the most effective factor for the improvement of the separation rate is to maintain the disperse phase in the mixer in the form of a solvent phase, that is, to operate the mixer with a solvent dispersion inside.

According to our finding, operation of the mixer holding an aqueous phase as the disperse phase (that is, an aqueous dispersion) causes separation of the liquids in the settler in such a relation that water droplets fall by gravity out of the solvent phase, against the continuous upward flow of the solvent phase. This relation is commonly given, for example, by Stokes' relationship, and the quantity of the aqueous phase to be entrained by the solvent phase can be determined from that equation. Generally speaking, the liquid droplet distribution that occurs inside a mixer tends to be relatively broad, though it depends on the agitating condition in the vessel. In such a situation, the fine water droplets are inevitably entrained by the solvent phase, with the consequence that the separation in the settler becomes insufficient and the extraction efficiency drops. It is therefore essential for the enhancement of the separation efficiency of the settler to narrow down the range of the dispersed droplet size distribution in the mixer and yet increase the average droplet diameter. Exactly the same applies to the operation of the mixer with the disperse phase as a solvent phase, or with a solvent dispersion. It has, however, been found that, even under the conditions of mixer agitation that produce the same liquid droplet size distribution, the coalescence rate varies largely with whether the disperse phase is an aqueous or solvent phase.

Thus, after our quantitative study on the separation behavior that follows the discontinuation of agitation in a mixer, it has now been found that, given the conditions such that the efficiency of each mixer-settler stage is kept at approximately 100%, the separation efficiency is strikingly improved with the solvent dispersion over that with the aqueous dispersion. While the choice of such a dispersed system generally has been a frequent subject of consideration from the viewpoint of mass transfer, there is no known case of the system having been selected by virtue of its separability in the settler.

BEST MODE FOR CARRYING OUT THE INVENTION

Examples of the difference in separation behavior between the solvent dispersion and the aqueous dispersion will be given below as Reference Examples.

REFERENCE EXAMPLE 1

A mixer comprising a glass tank with an inside diameter of 75 mm and a height of 75 mm and four pitched paddles each of which measuring 40 mm across and 10 mm wide was employed. The mixer was charged beforehand with 150 cc of an organic solvent which was a mixture of a tertiary amine (trioctylamine) and an organic diluent (3,3,5-trimethylcyclohexanone) in a ratio by volume of 50:50. With stirring, an aqueous solution of 1% acetic acid was added in small portions to provide a disperse phase of the aqueous solution containing 1% acetic acid (aqueous dispersion). The charge inside the mixer was completely mixed by thorough stirring, and then the agitation was brought to a stop. The period of time required for the separation of the charge into a clear aqueous phase and an organic solvent phase was measured to be 110 seconds.

REFERENCE EXAMPLE 2

The same apparatus as that used in Reference Example 1 was charged in advance with 150 cc of an aqueous solution containing 1% acetic acid. A total of 150 cc of the same tertiary amine-containing organic solvent as employed in the preceding example was added in small portions with stirring to obtain a disperse phase of the organic solvent (solvent dispersion). In the same manner as in the preceding example the time required for phase separation was measured to be 10 seconds.

It is known in the art that, where a mixer-settler extractor is operated for extraction of a system in which the volume of an organic solvent largely exceeds that of an aqueous solution being fed, the separability is improved by recycling part of the aqueous phase discharged from the settler into the mixer so that the apparent ratio by volume of the organic solvent phase to the aqueous phase in the mixer can approach 1:1. However, there has been no known method of improving the separability by dint of the disperse phase in the mixer.

Generally, in the agitation of a different liquid-liquid phase system, the identification of a disperse phase in the mixer is dictated by the proportions of volume the individual liquids occupy in the vessel. In the case of an aqueous phase and an organic solvent, the relationship is divided into three regions as graphically represented in FIG. 1.

Figure 1:
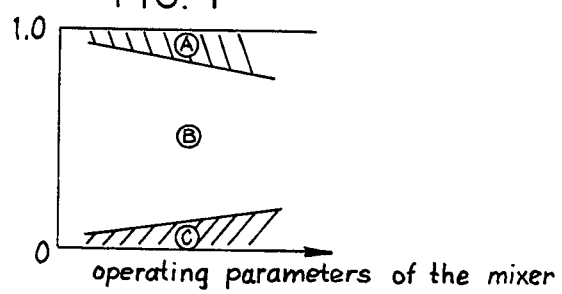
FIG. 1 is a graphic representation of the dispersion range in a mixer.

Referring to FIG. 1, the ratio by volume of the aqueous phase to the total liquid volume in the mixer is taken as ordinate, with the mixer operating factors, such as the agitation speed and temperature, as abscissa. The disperse phases in Regions (A), (B), and (C) differ as follows:

Region (A): The aqueous phase is fairly larger in volume than the organic solvent phase. In this case, the organic solvent phase constitutes the disperse phase inside the mixer. The aqueous phase cannot do so.

Region (C): The aqueous phase volume is considerably less than that of the organic solvent phase. Here, in the mixer, the aqueous phase can become the disperse phase but the organic solvent phase cannot.

Region (B): The relation between the aqueous and organic solvent phase volumes is "intermediate" between Regions (A) and (C). In this case, the aqueous phase can be either the disperse or continuous phase. The same applies to the organic solvent phase.

Quantitatively, the larger the volume the aqueous phase occupies in the mixer, the more stably the organic solvent phase can be maintained as the disperse phase.

In ordinary operation of the mixer-settler extractor, the mixed liquids in the mixer are often in Region (B), where the organic solvent phase can be the disperse phase or conversely the aqueous phase can be dispersed. The choice as to which phase is to be the disperse phase should be based on considerations from the viewpoints of mass transfer, separation of liquids, and other factors. Since Region (B) enables either the aqueous or organic solvent phase to serve as the disperse phase, ingress of some impurities having a coagulating effect into the mixer or a decrease or stoppage of the liquid feed for constituting the continuous phase by some accident can bring about a phenomenon in which the continuous and disperse phases readily replace each other, thus causing instable operation. The replacement of one phase by the other as the disperse phase poses varied problems, including difficulty of mass transfer and failure of extraction up to a predetermined degree, reduced liquid separation rate, and inadequate separation in the settler. Therefore, maintenance of a stable dispersed phase in the mixer is a necessity of prime importance.

In order to maintain the organic solvent phase stably as the disperse phase, it is only necessary to keep the liquids in the mixer within Region (A); the organic phase can then remain dispersed. When the volume of the aqueous phase being charged into the mixer is variable, the condition in the mixer has only to be kept from establishing Region (C) even when the aqueous phase feed is at a minimum. Thus, by recycling part of the aqueous phase discharged from the settler to the mixer, the proportion of the aqueous phase in the mixer can be increased and the condition in the mixer can be brought closer to Region (A) without adding any extra aqueous phase from the outside of the mixer-settler system. Region (A) can be established inside the mixer by further increasing the quantity of water being recycled. The disperse phase is then kept from coalescing into a continuous phase upon intrusion of any impurities having a coagulant effect into the mixer. Even if the feeding of the aqueous phase from outside the mixer-settler system has been shut off by some accident, Region (A) can be maintained in the mixer.

Thus, the present invention relates to a method of operating a mixer-settler characterized in that, in extracting an objective solute from its aqueous solution by using an organic solvent, a mixer-settler extractor is employed as the extractor and operated while maintaining a solvent dispersion in the mixer, and part of the aqueous phase discharged from the settler is recycled to the mixer so that the organic solvent phase in the mixer is stably maintained as a disperse phase.

Next, an example of measurement of the range for the above-described dispersion will be given below for reference.

REFERENCE EXAMPLE 3

Figure 2:
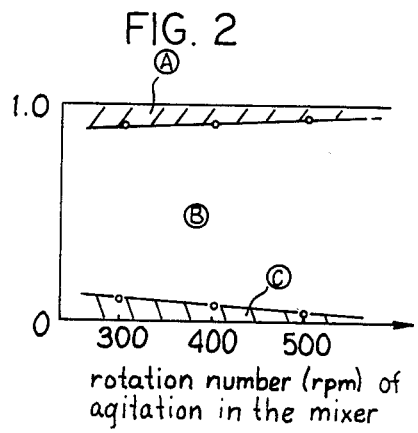
FIG. 2 is a graph showing the dispersion range in Reference Example 3.

With a system consisting of an aqueous solution of 1% acetic acid and an organic solvent containing a tertiary amine, the dispersion range was measured. As the mixer, the same apparatus as that used in Reference Example 1 was employed. In order to find out the boundary between Regions (A) and (B), the mixer was first charged with the organic solvent, and then the aqueous solution of acetic acid was slowly added at a predetermined agitation speed and at a fixed temperature (30° C.) to achieve thorough mixing. At the point the disperse phase was replaced by the organic solvent phase, the addition of the aqueous acetic acid solution and the agitation were discontinued, the mixed liquids were separated, and the proportion of the aqueous phase in the mixer was determined. Similarly, the boundary between Regions (B) and (C) was set up by charging the mixer beforehand with the aqueous acetic acid solution, gradually adding the organic solvent under the same conditions as above, and finding the point where the aqueous phase replaces the organic solvent phase as the disperse phase. The results are illustrated in FIG. 2.

As will be appreciated from the foregoing, it is possible in the system according to the invention to obtain the solvent dispersion in the mixer by charging the vessel with an aqueous solution in advance and then adding an organic solvent with stirring. Alternatively, the mixer may be about half filled with water and then supplied with the aqueous solution and the organic extractant. In the latter case it is desirable that the settler be charged with water beforehand. Part of the aqueous phase discharged from the settler is recycled to the mixer, and the liquid phases inside the mixer are controlled so that the ratio of the aqueous phase to the organic solvent phase is always within Region (B) in FIG. 1.

The method according to the invention is useful in recovering acetic, acrylic, nitric, or suchlike acids by extraction from an aqueous acid solution by the use of an extractive solvent consisting of a tertiary amine and an organic diluent. The method applies effectively to aqueous solutions in which the acid concentration is not more than 50% by weight.

The method of the invention is particularly useful in recovering acetic acid from its aqueous solution by employing an extractant which consists of a tertiary amine and an organic diluent. For example, using a mixer-settler extractor, acetic acid is extracted from its aqueous solution with the aid of an organic extractant which combines a tertiary amine, such as tri-n-octylamine (TOA), with an organic diluent which consists of an oxygenated organic solvent (with a boiling point higher than that of acetic acid), such as 3,3,5-trimethylcyclohexanone (TMCH).

The tertiary amine to be employed is one having a higher boiling point than acetic acid and which forms a nonaqueous phase. The amines having about 12 to 40 carbon atoms are desirable because of their low solubility in the aqueous phase and their separability from acetic acid upon distillation. Also, in order to obtain a high apparent distribution coefficient, it is advisable to use a tertiary amine having no large branch near the nitrogen atom. The presence of any ethyl group or larger substituent in any position adjacent to the nitrogen atom, or even on a carbon atom spaced from the nitrogen atom by one $CH_2$ group, will have an adverse effect upon the operation. Those having a cyclic structure near the nitrogen atom, like a benzyl group, also give unsatisfactory results. If a partial structure of tertiary amines is assumed to be $>N—CH_2—CR^1R^2$, then the amines in which $R^1$ represents a hydrogen atom and $R^2$ represents a hydrogen atom or a methyl group should be chosen. Examples of those desirable tertiary amines are trialkylamines having $C_6$ or higher alkyl groups, such as trihexylamine, trioctylamine, triisooctylamine (tris(2,4,4-trimethylpentyl)amine), trilaurylamine, dimethyllaurylamine,dimethylhexadecylamine, methyldi(tridecyl)amine, and dimethyldecylamine; tertiary amines having alkenyl groups, such as dimethyloleylamine, butylbis(5,5,7,7-tetramethyloct-2-en-1-yl)amine (XE-204); and tertiary amine mixtures, such as dimethyl-cocoamines, dimethyl-$C_{8-12}$ alkylamines, and dimethyl-hydrogenated beef tallow amines. Such a tertiary amine, if available commercially, may be directly employed. It is also possible to obtain a primary or secondary amine as an intermediate and then convert it into a tertiary state by alkylation in a customary manner. While varied tertiary amines as mentioned above may be employed, TOA is the most easily available and exhibits an excellent apparent distribution coefficient when used as an extractant in combination with an oxygenated organic solvent.

The organic solvent to be used together with the amine is one having a boiling point higher than that of acetic acid, such as any of ketones, alcohols, and carboxylic and phosphoric esters. The combination of such an oxygenated organic solvent and one of the aforementioned tertiary amines can effect the extraction of acetic acid from its aqueous solution with a particularly high apparent distribution coefficient.

The present invention will now be illustrated by an Example and a Comparative Example.

EXAMPLE 1

Figure 3:
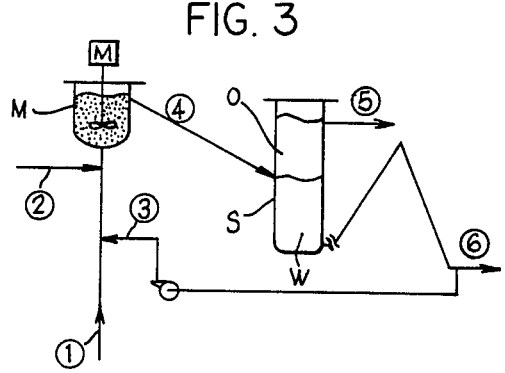
FIG. 3 is a flow sheet of arrangements used in an example of the invention.

A single-stage mixer-settler was arranged using the mixer of Reference Example 1 and a settler in the form of a glass container 75 mm in inside diameter and 300 mm in height. The flow sheet is given in FIG. 3, wherein the symbol m stands for the mixer having a motor M, s for the settler, o for an organic solvent phase in the settler, and w for an aqueous phase. An aqueous solution of 1 wt% acetic acid containing 0.1 wt% solids was fed to the mixer through a line (1) at a rate of 5.3 l/H, and an organic solvent containing a tertiary amine was supplied to the mixer through a line (2) at a rate of 9 l/H. The liquid mixture thus formed by solvent dispersion in the mixer was thence transferred via a line 4 to the settler, where it was separated into an organic solvent phase o and an aqueous phase w. Of the aqueous phase drained from the settler through a line (6), the water portion to be returned to the mixer was metered to be 8 l/H and was recycled through a line (3). The proportion of the aqueous phase in the mixer was then $(9+8)/(5.3+9+8)=0.76$. The condition in the mixer was that of Region (B), but it was fairly close to Region (A). If the organic solvent phase was the disperse phase, the proportion would be $8/(9+8)=0.47$ even when the feeding of the aqueous acetic acid solution was shut off, and Region (B) continued to prevail in the mixer. Under these conditions the extractor was continuously operated for about one month. During the period troubles due to malfunctioning of the equipment, such as a decrease in the aqueous acetic acid feed or, in extreme cases, total cut-off, took place once a day on the average. However, there occurred no phenomenon in which the disperse phase became aqueous. Separation of the mixed liquids in the settler was always satisfactory, and the organic solvent phase was discharged through a line (5).

COMPARATIVE EXAMPLE 1

Continuous operation was carried out with the same apparatus and under the same conditions as in Example 1, excepting that the aqueous phase drained from the settler was completely drawn out of the system through the line (6) without any partial recycling to the mixer. The condition inside the mixer was $5.3/(5.3+9)=0.37$, representing Region (B), but sometimes it was supplanted by Region (C) when the feed of the aqueous acetic acid solution was decreased or cut off. In this way uninterrupted operation was performed for about one month, during which troubles of the feed reduction or cutoff by the same reasons as in Example 1 occurred at an average frequency of once a day. Two-thirds of the troubles led to inadequate liquid separation in the settler due to a change in the disperse phase from the organic solvent to aqueous phase.

The present method places special weight on the separation of mixed liquids in the settler and hence has for its object to maintain the organic solvent phase stably as the disperse phase. Where the use of the aqueous phase is preferred for the disperse phase on some other grounds, part of the organic solvent phase from the settler may be recycled to the mixer. Then, in the same manner as for stably maintaining the organic phase as the disperse phase, the aqueous phase can be kept as a stable disperse phase.

It will be understood from the foregoing Example and Comparative Example that the method of operating a mixer-settler in accordance with the present invention can stabilize the dispersion inside the mixer and maintain a satisfactory state of liquid separation in the settler.

What is claimed is:

1. A method of recovering acetic acid from an aqueous acetic acid solution, comprising the steps of: feeding into the mixer of a mixer-settler extraction system
   (1) said aqueous solution of acetic acid, and
   (2) a liquid organic extracting agent comprising a tertiary amine having a boiling point higher than the boiling point of acetic acid, and mixing said aqueous solution and said extracting agent in said mixer so as to form a dispersion in which the disperse phase is droplets of said extracting agent which droplets are dispersed in a continuous phase of said aqueous solution, whereby the acetic acid is extracted from said aqueous solution and is transferred to said extracting agent; then, in the settler of said extraction system, allowing said dispersion to settle whereby to obtain separately (i) an aqueous phase and (ii) a liquid organic extracting agent phase containing acetic acid; and recycling a part of said aqueous phase directly into said mixer in an amount effective to maintain, in said mixer, the volumetric ratio of (a) the aqueous phase (i) plus the aqueous solution (1), to (b) the total liquids in said mixer, at a level effective to maintain said dispersion in a stable condition in said mixer.

2. A method as claimed in claim 1 in which, before said extracting agent is fed into said mixer, said mixer is partially filled with said aqueous solution and then the remainder of said aqueous solution and said liquid organic extracting agent are fed into said mixer.

3. A method as claimed in claim 1 in which, before said extracting agent is fed to said mixer, the entirety of said aqueous solution is placed in said mixer and then said liquid organic extracting agent is fed into said mixer.

4. A method as claimed in claim 1 in which the acid concentration of said aqueous solution of acetic acid is not more than 50% by weight.

5. A method as claimed in claim 1 in which said liquid organic extracting agent consists essentially of said tertiary amine and an oxygen-containing organic material having a boiling point higher than the boiling point of acetic acid.

6. A method as claimed in claim 1 in which said liquid organic extracting agent consists essentially of tri-n-octylamine and 3,5,5-trimethylcyclohexanone.

* * * * *

UNITED STATES PATENT AND TRADEMARK OFFICE
CERTIFICATE OF CORRECTION

PATENT NO. : 4,562,288
DATED : December 31, 1985
INVENTOR(S) : Kunio Kogo et al

It is certified that error appears in the above-identified patent and that said Letters Patent is hereby corrected as shown below:

Column 8, line 26; change "3,5,5-trimethylcyclohexanone" to ---3,3,5-trimethylcyclohexanone---.

Signed and Sealed this

Twenty-seventh Day of May 1986

[SEAL]

Attest:

DONALD J. QUIGG

Attesting Officer

Commissioner of Patents and Trademarks